United States Patent
Ishida et al.

(10) Patent No.: US 9,451,435 B2
(45) Date of Patent: Sep. 20, 2016

(54) RADIO COMMUNICATION SYSTEM, SERVER, AND MESSAGE NOTIFICATION METHOD

(75) Inventors: Masanori Ishida, Chiyoda-ku (JP); Kouki Hayashi, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 1 day.

(21) Appl. No.: 14/235,952

(22) PCT Filed: Jul. 23, 2012

(86) PCT No.: PCT/JP2012/068629
§ 371 (c)(1),
(2), (4) Date: Jan. 29, 2014

(87) PCT Pub. No.: WO2013/021807
PCT Pub. Date: Feb. 14, 2013

(65) Prior Publication Data
US 2014/0155021 A1  Jun. 5, 2014

(30) Foreign Application Priority Data

Aug. 10, 2011  (JP) ................................. 2011-175348

(51) Int. Cl.
| | |
|---|---|
| *H04M 11/04* | (2006.01) |
| *H04M 1/725* | (2006.01) |
| *H04W 4/22* | (2009.01) |
| *H04W 4/02* | (2009.01) |

(52) U.S. Cl.
CPC ................ *H04W 4/22* (2013.01); *H04W 4/02* (2013.01)

(58) Field of Classification Search
CPC ... G06F 17/3087; H04W 4/02; G08B 27/005
See application file for complete search history.

(56) References Cited

U.S. PATENT DOCUMENTS

| | | | |
|---|---|---|---|
| 2003/0078029 A1* | 4/2003 | Petite ..................... | H04M 11/04 455/404.1 |
| 2009/0227224 A1* | 9/2009 | Aftelak .................. | H04M 11/04 455/404.2 |
| 2010/0197279 A1* | 8/2010 | Krco ...................... | H04W 8/18 455/412.2 |

FOREIGN PATENT DOCUMENTS

| | | |
|---|---|---|
| EP | 1 176 840 A1 | 1/2002 |
| JP | 2005-284825 A | 10/2005 |

(Continued)

OTHER PUBLICATIONS

International Search Report Issued Aug. 14, 2012 in PCT/JP12/068629 Filed Jul. 23, 2012.

(Continued)

*Primary Examiner* — Tammy Pham
*Assistant Examiner* — Frantz Bataille
(74) *Attorney, Agent, or Firm* — Oblon, McClelland, Maier & Neustadt, L.L.P.

(57) ABSTRACT

A server includes an area information retrieving unit that retrieves, when a phenomenon occurs, information indicating an area of the phenomenon; a subscriber information retrieving unit that retrieves subscriber information of a user terminal served by a base station in the area from a subscriber information management server that associates and manages, for each user terminal, subscriber information and serving base station information, based on the area information; a personal information checking unit that checks the personal information managed by a personal information database against the subscriber information retrieved by the subscriber information retrieving unit, and that identifies the user terminal including the personal information which includes the subscriber information; and a message transmitting unit that reports to the identified user terminal that a user of the user terminal which includes the subscriber information is in the area of the phenomenon.

6 Claims, 9 Drawing Sheets

(56) References Cited

FOREIGN PATENT DOCUMENTS

| JP | 2006 133828 | 5/2006 |
| JP | 2007 053816 | 3/2007 |
| JP | 2007 259205 | 10/2007 |
| JP | 2010 191503 | 9/2010 |

OTHER PUBLICATIONS

Combined Chinese Office Action and Search Report issued Mar. 11, 2015 in Chinese Patent Application No. 201280034168.3 (with English language translation).

Extended European Search Report issued Apr. 1, 2015 in Patent Application No. 12822827.7.

Nico Deblauwe, et al., "Combining GPS and GSM Cell-ID positioning for Proactive Location-based Services", Fourth Annual International Conference ON, XP031230267, Aug. 6, 2007, pp. 1-7.

Arnon Amir, et al., "Buddy tracking-efficient proximity detection among mobile friends", Twenty-Third Annual Joint Conference of the IEEE Computer and Communications Societies, vol. 1, XP010740453, Mar. 7, 2004, pp. 298-309.

Boonsri Dickinson, "Life360 turns your smartphone into a lifeline", CNET, XP055179024, Jun. 20, 2011.

Office Action issued May 7, 2014, in Japanese Patent Application No. 2011-175348 with English translation.

* cited by examiner

FIG.2

| SUBSCRIBER INFORMATION | | SERVING BASE STATION |
|---|---|---|
| NAME | AAA | |
| TELEPHONE NUMBER | 090-1234-5678 | α α α |
| E-MAIL ADDRESS | ○○○@XXX.ne.jp | |
| ⋮ | | ⋮ |

FIG.3

| IDENTIFIER OF USER TERMINAL | PIM DATA | |
|---|---|---|
| 090-4321-5678 | NAME | AAA |
| | TELEPHONE NUMBER | 090-1234-5678 |
| | E-MAIL ADDRESS | ○○○@XXX.ne.jp |
| | NAME | BBB |
| | TELEPHONE NUMBER | 090-1234-0123 |
| | E-MAIL ADDRESS | ×××@XXX.ne.jp |
| | ⋮ | |
| ⋮ | ⋮ | |

US 9,451,435 B2

RADIO COMMUNICATION SYSTEM, SERVER, AND MESSAGE NOTIFICATION METHOD

TECHNICAL FIELD

The present invention relates to a radio communication system.

BACKGROUND ART

When a large-scale disaster such as a large earthquake occurs, in addition to a governmental agency and a disaster prevention agency which are engaged in a recovery activity, many users use voice calls to confirm safety in a disaster area. During this time, a large volume of traffic is processed by a network, compared to a normal time. Due to the processing of the large volume of traffic by the network, it becomes a state where it is difficult to establish communication connections. Since it becomes a state in which it is difficult to establish communication connections, the traffic may be controlled by the network by regulating the communications. When the traffic is controlled by the network, it becomes difficult to make confirmation of the safety in the disaster area.

A technique has been known such that, even if a system of a mobile switching center is down or a transmission line failure occurs, and communication with a radio base station controller is disabled, a terminal of a police station or a fire station can be contacted when a disaster occurs (cf. Patent Document 1, for example).

Further, a technique has been known such that, in processing of communication requests during a time of disaster, an overcrowded condition or a congestion state is avoided as much as possible, thereby allowing as many users as possible to communicate (cf. Patent Document 2, for example).

RELATED ART DOCUMENT

Patent Document

Patent Document 1: Japanese Unexamined Patent Publication No. 2007-259205
Patent Document 2: Japanese Unexamined Patent Publication No. 2007-053816

SUMMARY OF THE INVENTION

Problem to be Solved by the Invention

There are few methods of finding where a relative, a friend, or an acquaintance is (hereinafter, which is referred to as the "relative or the like") during the time of a large-scale disaster.

For example, even if the relative or the like stays in a neighborhood of the disaster area due to a business trip or travel, in many cases, this fact is actually found out later after a certain amount of time has passed.

Further, even if the relative or the like lives in the neighborhood of the disaster area, it is possible that no damage or injury is received because the relative or the like was at another location at the time of the disaster. However, there are no methods of finding whether they are safe, except for confirming by a telephone, for example.

The present invention is achieved in view of the above-described point. An object of the present invention is to provide a technique by which existence of relatives and the like in a neighborhood of a disaster area can be reported when a disaster occurs.

Means for Solving the Problem

In order to solve the above-described problem, the radio communication system is embodied as a radio communication system including a personal information data server that manages personal information to be stored in a user terminal;

a subscriber information management server that manages, for each of the user terminals, the subscriber information and information representing a base station which serves for the user terminal while associating the subscriber information with the information representing the base station; and a personal information checking server, wherein the personal information checking server includes an area information retrieving unit that retrieves, when a specified phenomenon occurs, area information representing an area where the specified phenomenon occurs;

a subscriber information retrieving unit that retrieves the subscriber information of the user terminal from the subscriber information management server, based on the area information representing the area where the specified phenomenon occurs, wherein the user terminal is served by the base station installed in the area where the specified phenomenon occurs, and the area information representing the area where the specified phenomenon occurs is retrieved by the area information retrieving unit;

a personal information checking unit that checks the personal information managed by the personal information database against the subscriber information retrieved by the subscriber information retrieving unit, and that identifies the user terminal which includes the personal information including the subscriber information;

a message transmitting unit that reports to the user terminal which is identified by the personal information checking unit that the/e is a user of the user terminal in the area where the specified phenomenon occurs, wherein the user terminal includes the subscriber information, and wherein the subscriber information is included in the personal information of the user terminal.

The personal information checking server may includes a personal information synchronization processing unit that performs synchronization with the personal information data server in regard to the personal information, wherein the personal information checking unit may check the personal information against the subscriber information, wherein the personal information is synchronized by the personal information synchronization processing unit, and the subscriber information is retrieved by the subscriber information retrieving unit.

The personal information checking server may include a personal information retrieving unit that retrieves, when the specified phenomenon occurs, the personal information from the personal information data server, wherein the personal information checking unit may check the personal information against the subscriber information, wherein the personal information is retrieved by the personal information retrieving unit, and the subscriber information is retrieved by the subscriber information retrieving unit.

The personal information managed by the personal information data server may include phonebook data.

The area information retrieving unit may retrieve the information representing the area, wherein the area is specified by at least one of the area which is specified at a cell level, the area which is specified at a tracking area level, and the area which is set by an operator.

The server is embodied as the server including an area information retrieving unit that retrieves, when a specified phenomenon occurs, information representing an area where the specified phenomenon occurs;

a subscriber information retrieving unit that retrieves subscriber information of a user terminal from a subscriber information management server, based on the information representing the area where the specified phenomenon, occurs, wherein the subscriber information management server manages, for each of the user terminals, the subscriber information and information representing a base station which serves for the user terminal while associating the subscriber information with the information representing the base station, wherein the information representing the area where the specified phenomenon occurs is retrieved by the area information retrieving unit, and wherein the user terminal is served by the base station which is installed in the area where the specified phenomenon occurs;

a personal information checking unit that checks the personal information against the subscriber information, and that identifies a user terminal that includes the personal information including the subscriber information, wherein the personal information is managed by a personal information database that manages the personal information stored in the user terminal, and the subscriber information is retrieved by the subscriber information retrieving unit; and a message transmitting unit that reports to the user terminal which is identified by the personal information checking unit that there is a user of the user terminal in the area where the specified phenomenon occurs, wherein the user terminal includes the subscriber information, wherein the subscriber information is included in the personal information of the user terminal.

Further, it can be configured as a message notification method which is executed by the above-described radio communication system.

Effect of the Present Invention

According to the disclosed radio communication system, when a disaster occurs, existence of relatives and the like in a neighborhood of the disaster area can be reported.

BRIEF DESCRIPTION OF THE DRAWINGS

FIG. 2 is a diagram showing one embodiment of a table which represents a correspondence between subscriber information and serving base station information, which corresponds to the subscriber information;

FIG. 3 is a diagram showing one embodiment of a table which represents a correspondence between an identifier of a user terminal and PIM data stored in the user terminal;

EMBODIMENTS FOR CARRYING OUT THE INVENTION

Figure 1:
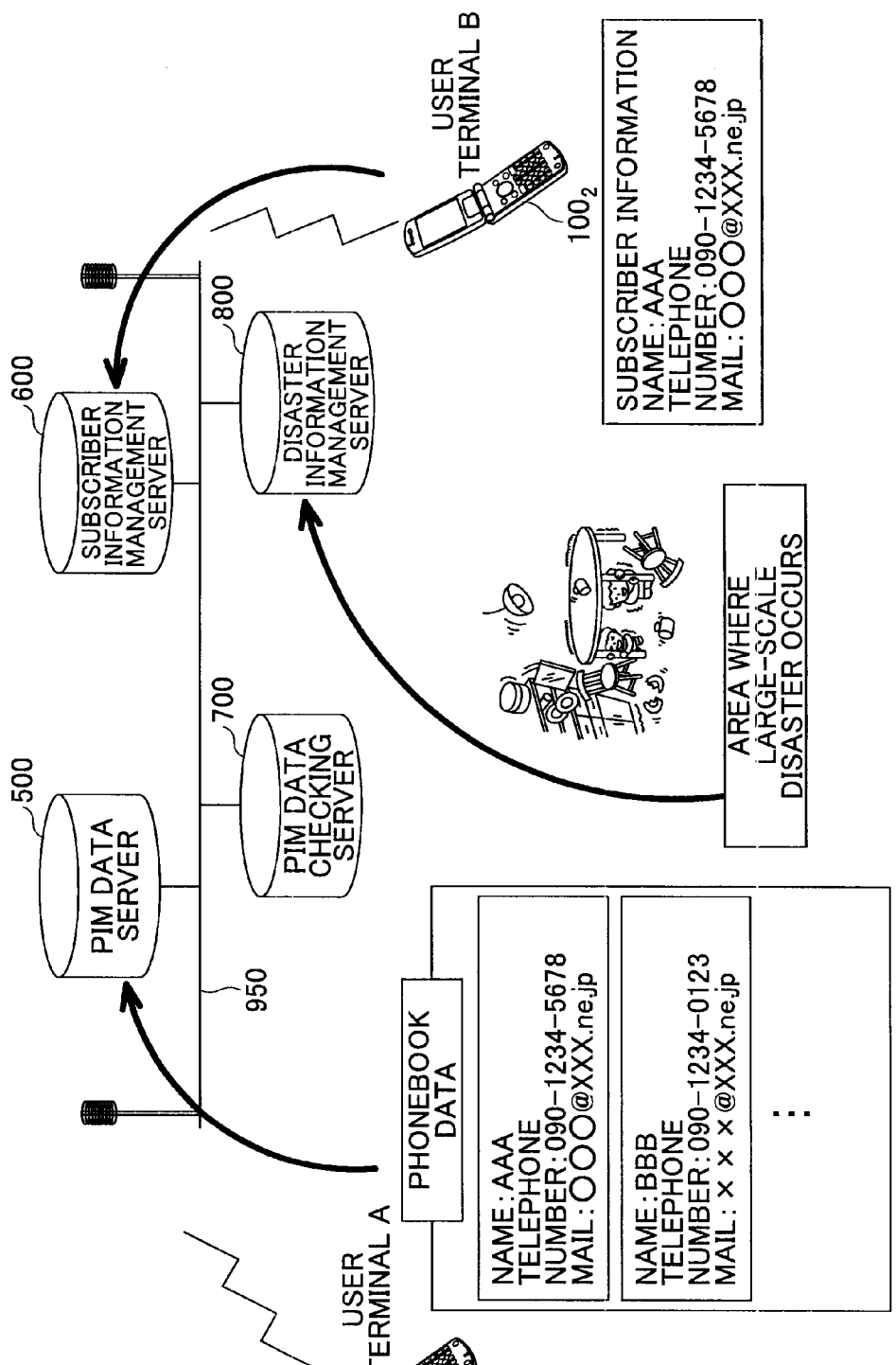
FIG. 1 is a diagram showing an outline of one embodiment of a radio communication system.

Next, a configuration for implementing the present invention is explained based on the following embodiment, while referring to the drawings. Here, in all the drawings for illustrating the embodiment, the same reference numeral is used for entities having the same function, thereby omitting repeated explanations.

Embodiment

Radio Communication System

FIG. 1 shows an outline of one embodiment of a radio communication system.

The radio communication system includes user terminals $100_1$-$100_n$ (n is an integer such that n>0); a personal information manager/management (PIM) data server 500; a subscriber information management server 600; a PIM data checking server 700; and a disaster information management server 800. FIG. 1 shows a case where n=2, as an example.

The user terminal $100_2$ reports information representing a serving base station (which is referred to as the "serving base station information") to the subscriber information management server 600. The user terminal $100_1$ may also report the serving base station information to the subscriber information management server 600. The serving base station information includes, together with the serving base station information, for example, at least one of an identifier of the user terminal $100_2$ which reports the serving base station information, a name of the subscriber, and an e-mail address. The identifier of the user terminal may be a telephone number. Hereinafter, the identifier of the user terminal, the name of the subscriber, the e-mail address, and the like are collectively referred to as the "subscriber information." In other words, the subscriber information includes at least one of the identifier of the user terminal, the name of the subscriber, and the e-mail address. The subscriber information management server 600 manages the subscriber information and the serving base station information corresponding to the subscriber information, while associating the subscriber information with the serving base station information.

FIG. 2 shows an example of a table which represents a correspondence between the subscriber information managed by the subscriber information management server 600 and the serving base station information, which corresponds to the subscriber information.

In the example shown in FIG. 2, the subscriber information which is the name "AAA," the telephone number "090-1234-5678," and the e-mail address "000@XXX-.ne.jp" and the serving base station information "ααα" are stored, while the subscriber information is associated with the serving base station information.

The PIM data server 500 manages PIM data stored in the user terminal $100_1$. The PIM data includes personal information. The PIM data server 500 may manage PIM data stored in the user terminal $100_2$. The PIM data may be transmitted to the PIM data server 500 when the user terminal $100_1$ is operated by the user. The PIM data server 500 manages the PIM data and information representing the user terminal, which reports the PIM data, while associating the PIM data with the information representing the user terminal. FIG. 1 shows phonebook data as an example of the PIM data. The phonebook includes a name, a telephone number, and an e-mail address, for example. The phonebook of the user terminal $100_1$ which is shown in FIG. 1 includes a relative having the name "AAA," the telephone number "090-1234-5678," and a mail "000@XXX.ne.jp," and a relative having the name "BBB," the telephone number "090-1234-0123", and a mail "XXX@XXX.ne.jp."

FIG. 3 shows one example of a table representing a correspondence between the identifier of the user terminal, which is managed by the PIM data server 500, and the PIM data, which is stored in the user terminal.

In the example shown in FIG. 3, the identifier of the user terminal "090-4321-5678" and the phonebook, which is included in the PIM data stored in the user terminal, are stored, while the identifier of the user terminal is associated with the phonebook. The phonebook includes a user having the name "AAA," the telephone number "090-1234-5678," and the e-mail address "000@XXX.ne.jp," and a user having the name "BBB," the telephone number "090-1234-0123," and the e-mail address "xxx@XXX.ne.jp."

When a large-scale disaster occurs, the disaster information management server 800 collects disaster area information. For example, broadcast information from a Cell Broadcast Center (CBC) may be collected. Further, earthquake information and typhoon information from the Cell Broadcast Center may be collected. The disaster information management server 800 may be the Cell Broadcast Center. When the disaster occurs, the disaster information management server 800 may transmit a command, which is for causing the existence of the relative or the like to be reported, to the PIM data checking server 700. The disaster information management server 800 manages the disaster area information. The disaster area information includes information representing an area in the disaster area. Specifically, the area in the disaster area may be specified at a level of cells. For example, a cell ID of a cell included in the disaster area is specified in a list of cell IDs. Further, the area in the disaster area may be specified at a level of a tracking area (TA). For example, a tracking area identifier of a tracking area included in the disaster area is specified in a list of identifiers of tracking areas. Further, an area in the disaster area may be specified at a level of an emergency area. An area in the disaster area may be specified at a level other than the cell level, the tracking area level, and the emergency area level. The emergency areas are set by an operator. For example, an emergency area identifier of an emergency area included in the disaster area is specified in a list of identifiers of the emergency areas. The disaster information management server 800 reports the disaster area information, in response to an inquiry of the disaster area information from the PIM data checking server 700.

When the large-scale disaster occurs, the PIM data checking server 700 retrieves the disaster area information from the disaster information management server 800. The PIM data checking server 700 identifies a base station that covers an area in the disaster area (which is referred to as the "disaster area base station," hereinafter), based on the disaster area information which is retrieved from the disaster information management server 800. A base station which is installed in the disaster area may be identified. The PIM data checking server 700 retrieves subscriber information of the user terminal which is served by the disaster area base station from the subscriber information management server 600. Specifically, at least one of the name of the user of the user terminal, the telephone number, and the e-mail address may be retrieved, for example.

The PIM data checking server 700 determines whether there is PIM data including the subscriber information of the user terminal which is served by the disaster area base station, among PIM data pieces stored in the PIM data server 500. A determination may be made as to whether there is PIM data including at least one information item included in the subscriber information. The PIM data checking server 700 determines whether there is PIM data including any information item among information items included in the subscriber information of the user terminal which is served by the disaster area base station, among the PIM data pieces which are stored in the PIM data server 500. When the PIM data exists including the information item among the information items included in the subscriber information of the user terminal which is served by the disaster area base station, among the PIM data pieces which are stored in the PIM data server 500, the PIM data checking server 700 reports it to another user terminal having the PIM data which includes the information item of the information items included in the subscriber information of the user terminal, which is served by the disaster area base station.

When there isn't PIM data which includes any information item among the information items included in the subscriber information of the user terminal which is served by the disaster area base station, among the PIM data pieces which are stored in the PIM data server 500, the PIM data checking server 700 does not perform reporting. When there isn't PIM data which includes any information item among the information items included in the subscriber information of the user terminal which is served by the disaster area base station, the PIM data checking server 700 may report that there are no relatives in the disaster area.

When the PIM data includes the subscriber information of the user terminal which is served by the disaster area base station, the other user terminal which stores the PIM data is notified that the user of the user terminal having the subscriber information which is included in the PIM data is in the disaster area, and thereby another user of the other user terminal can find that the relative or the like was in the neighborhood of the disaster area at the time of the large-scale disaster. That is because, in many cases, a user who is recorded in the PIM data is a relative or the like of another user of the user terminal that stores the PIM data.

Figure 4:
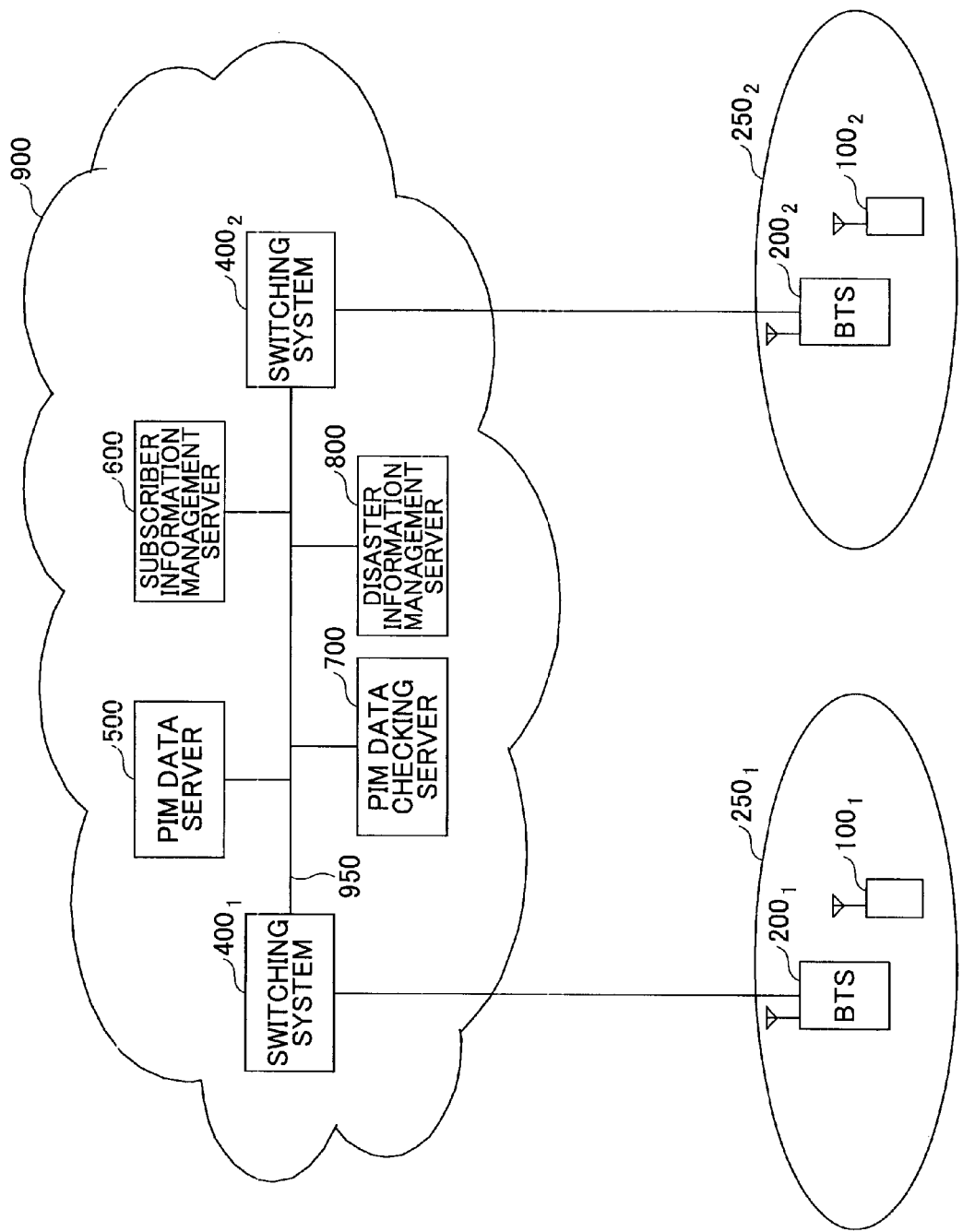
FIG. 4 is a diagram showing one embodiment of the radio communication system.

FIG. 4 shows one embodiment of the radio communication system.

FIG. 4 shows a first radio communication system (which is indicated by a suffix "1") and a second radio communication system (which is indicated by a suffix "2").

The first radio communication system and the second radio communication system may be the same communication systems, or different communication systems. Specifically, they may include the same radio access schemes, or different radio access schemes.

The first radio communication system includes a base station $200_1$. The base station $200_1$ covers a cell $250_1$. The first radio communication system enables radio communications in an area covered by the base station $200_1$. The first radio communication system may include plural base stations.

The second radio communication system includes a base station $200_2$. The base station $200_2$ covers a cell $250_2$. The second radio communication system enables radio communications in an area covered by the base station $200_2$. The second radio communication system may include plural base stations.

In the embodiment, a case is explained, as an example, where a disaster occurs in an area including at least a portion of the area covered by the second radio communication system. It is the same for a case where a disaster occurs in an area including at least a portion of the area covered by the first radio communication system.

The user terminal $100_1$ is synchronized with the PIM data server 500 in regard to the PIM data. Specifically, when the PIM data which is included in the user terminal $100_1$ is updated, PIM data of the user terminal $100_1$ which is included in the PIM data server 500 is also updated by the updated information. The user terminal $100_2$ may also be synchronized with the PIM data server 500 in regard to the PIM data. Specifically, when the PIM data which is included in the user terminal $100_2$ is updated, PIM data of the user terminal $100_2$ which is included in the PIM data server 500 is also updated by the updated information.

The user terminal $100_2$ is served the cell $250_2$, which is covered by the base station $200_2$. The user terminal $100_2$ sends information representing the serving base station to the subscriber information management server 60C.

Each of the user terminals $100_1$ and $100_2$ may be any suitable mobile station with which the user can perform communication. For example, a mobile telephone, an information terminal, a personal digital assistant, and a mobile personal computer are considered. However, the user terminals $100_1$ and $100_2$ are not limited to these.

The radio communication system may be divided into a radio access network (RAN) (not shown) that mainly performs radio access control and a core network (CN) 900 that performs mobility management, call control, and service control. In the embodiment, the core network (ON) 900, which is especially related to the present application, is mainly explained, and an explanation of the radio access network is omitted.

The RAN includes a base transceiver station (Base Transceiver Station: BTS) $200_1$ ($200_2$) and a radio network controller (Radio Network Controller: RNC) (not shown).

The CN 900 is formed of a circuit switched (Circuit Switched: CS) domain and a packet switched (Packet Switched: PS) domain. In general, the CS domain provides voice type services, and the PS domain provides data communication type services.

The PIM data server 500, the subscriber information management server 600, the PIM data checking server 700, and the disaster information management server 800 are connected to a switching system $400_1$ ($400_2$).

The base transceiver station $200_1$ is connected to the switching system $400_1$, and the base transceiver station $200_2$ is connected to the switching system $400_2$.

Further, the PIM data server 500 is synchronized with the PIM data switching server 700 in regard to the PIM data. Specifically, when the PIM data of the user terminal $100_1$ in the PIM data server 500 is updated in accordance with updating of the PIM data included in the user terminal $100_1$, the PIM data of the user terminal $100_1$ in the PIM data checking server 700 is also updated by the updated information. Similarly, when the PIM data of the user terminal $100_2$ in the PIM data server 500 is updated in accordance with updating of the PIM data included in the user terminal $100_2$, the PIM data of the user terminal $100_2$ in the PIM data checking server 700 is also updated by the updated information.

When a large-scale disaster occurs, the PIM data checking server 700 retrieves disaster area information from the disaster information management server 800. The large-scale disaster includes an earthquake or a tsunami, for example. The PIM data checking server 700 may be caused to start operating by an operation, by the user terminal $100_1$, for inquiring whether a relative or the like is in a neighborhood of the disaster area. Alternatively, when a disaster occurs, and when a command to start the operation is issued by the disaster information management server 800, the operation may be started in accordance with the command.

The PIM data checking server 700 identifies the disaster area base station, based on information representing the disaster area which is included in the disaster area information. Further, the PIM data checking server 700 retrieves information representing the user terminal which is served by the disaster area base station from the subscriber information management server 600. Specifically, the PIM data checking server 700 sends the information representing the disaster area base station to the subscriber information management server 600. Here, the information representing the disaster area base station is identified based on the disaster area included in the disaster area information which is retrieved from the disaster information management server 800. In response, the subscriber information management server 600 sends the subscriber information of the user terminal which is served by the disaster area base station, based on the information representing the disaster area base station from the PIM data checking server 700. The PIM data checking server 700 retrieves the subscriber information of the user terminal which is served by the disaster area base station.

The PIM data checking server 700 determines whether there is PIM data including the subscriber information of the user terminal which is served by the disaster area base station, among the PIM data pieces stored in the PIM data server 500.

When the PIM data checking server 700 determines that there is a corresponding user terminal having the PIM data including the subscriber information of the user terminal which is served by the disaster area base station, the PIM data checking server 700 reports it to the corresponding user terminal having the PIM data.

<PIM Data Checking Server>

Figure 5:
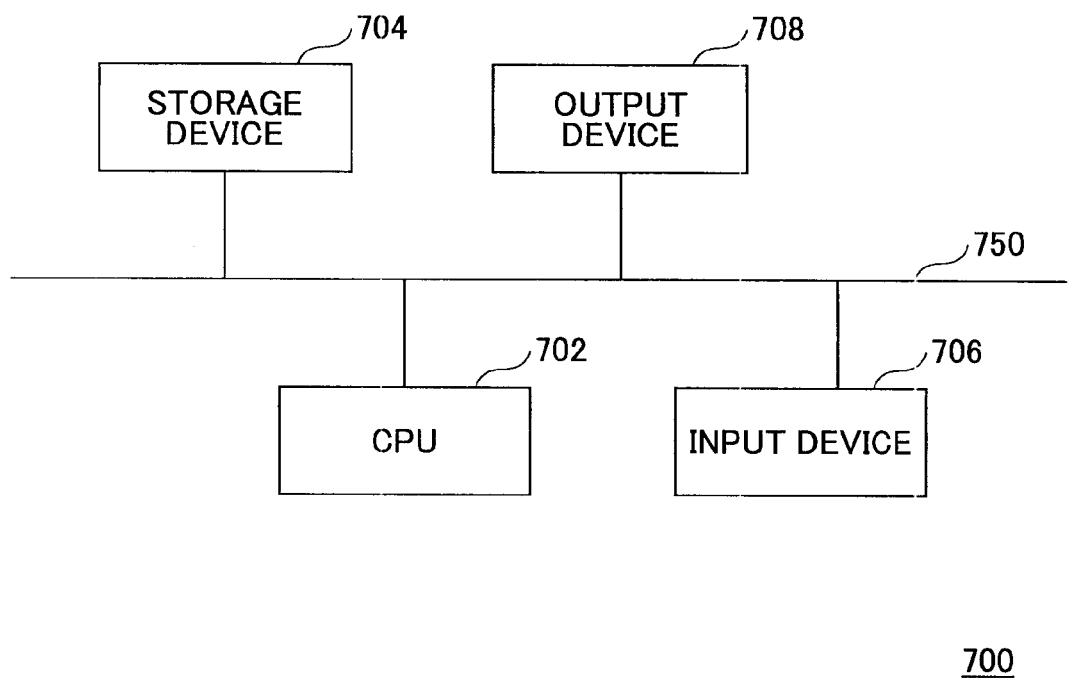
FIG. 5 is a diagram showing one embodiment of a PIM data checking server.

FIG. 5 shows one embodiment of the PIM data checking server 700. FIG. 5 mainly shows a hardware configuration.

The PIM data checking server 700 includes a central processing unit (Central Processing Unit: CPU) 702; a storage device 704; an input device 706; and an output device 708. These devices are connected through a bus 750.

The CPU 702 performs control of the storage device 704, the input device 706, and the output device 708. The CPU 702 functions in accordance with a program stored in the storage device 704, and the CPU 702 performs predetermined processing.

The storage device 704 includes various types of applications; various types of services; an operating system (Operating System: OS); and various types of drivers. For example, the storage device 704 is an external storage device that stores data and a program in a computer. For example, a hard disk (hard disk, fixed disk), a flexible disk (Flexible Disk), a MO (Magneto-Optical disk), a CD-R (Compact Disk Recordable), and a magnetic tape may be considered.

The application is software having a function for executing a process, where the process is executed in the PIM data checking server 700.

The operating system is software that provides an interface which abstracts the hardware to the application software in the PIM data checking server 700.

The input device 706 is formed of a keyboard and a touch panel, for example. The input device 706 is a device for commanding and for performing data inputting to the PIM data checking server 700. The command includes that for the operating system and that for the application.

The output device 708 is formed of a display, for example. The output device 708 displays a processing state and a processed result by the PIM data checking server 700. The processing state and the processed result include those of the operating system and those of the application. The display include a liquid crystal display (Liquid Crystal Display: LCD), a CRT (Cathode Ray Tube) display, a plasma (Plasma Display Panel: PDP) display, and an organic EL (Electro-Luminescence) display, for example.

<Functions of PIM Data Checking Server>

Figure 6:
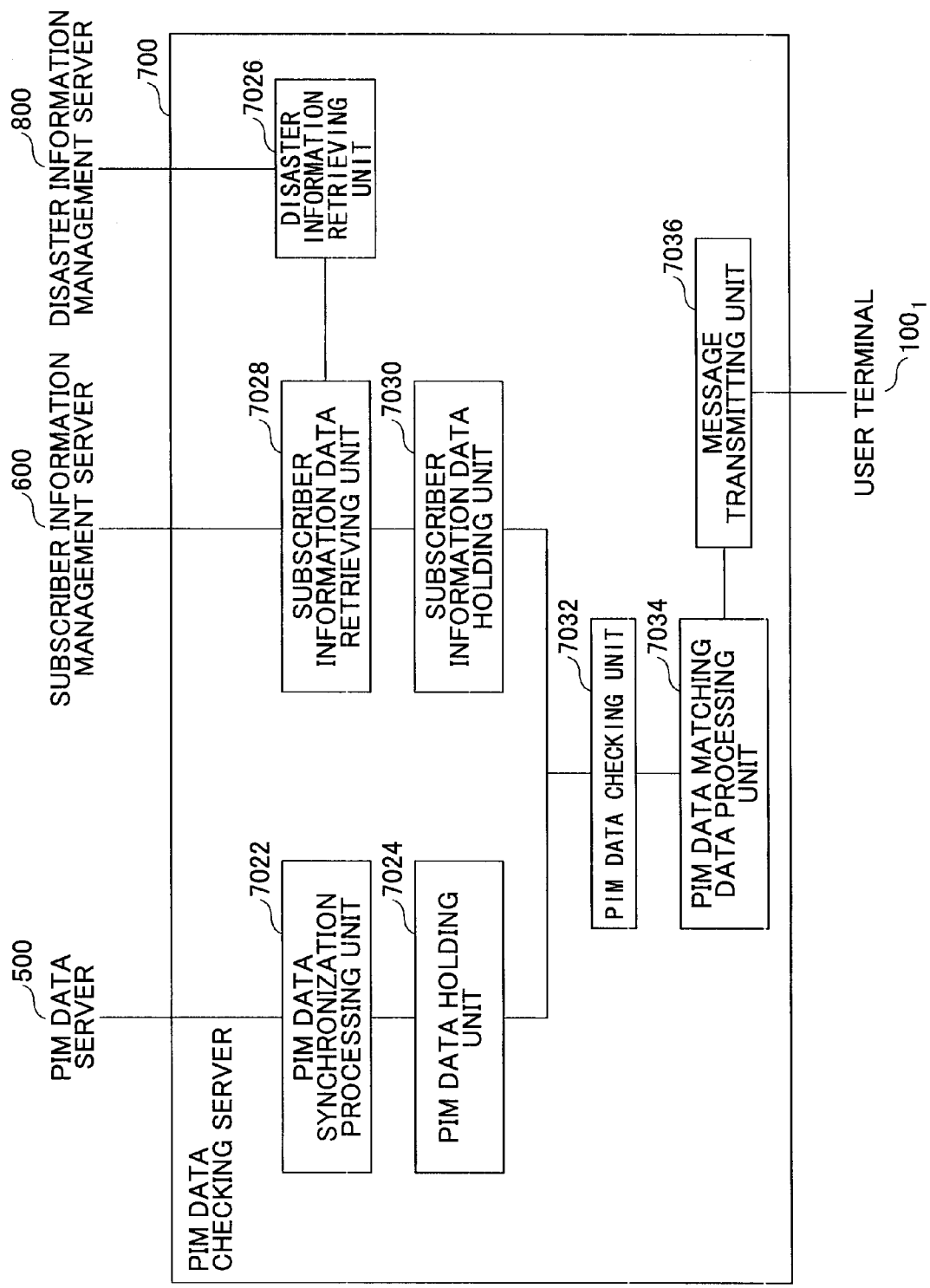
FIG. 6 is a functional block diagram showing one embodiment of the PIM data checking server.

FIG. 6 shows a functional block diagram of one embodiment of the PIM data checking server 700. FIG. 6 mainly shows functions that are executed by the CPU 702. Specifically, these are performed by the CPU 702, where the CPU 702 operates in accordance with a PIM data checking program stored in the storage device 704.

The PIM data checking server 700 includes a PIM data synchronization processing unit 7022; a PIM data holding unit 7024; a disaster information retrieving unit 7026; a subscriber information data retrieving unit 7028; a subscriber information data holding unit 7030; a PIM data checking unit 7032; a PIM data matching data processing unit 7034; and a message transmitting unit 7036.

The PIM data synchronization processing unit 7022 performs a synchronizing process with the PIM data server 500 in regard to the PIM data. Specifically, the PIM data synchronization processing unit 7022 may request the PIM data from the PIM data server 500 regularly or irregularly. The PIM data synchronization processing unit 7022 stores the PIM data from the PIM data server 500 in the PIM data holding unit 7024. The PIM data synchronization processing unit 7022 may retrieve all the PIM data from the PIM data server 500 during the synchronization with the PIM data server 500 in regard to the PIM data, or the PIM data synchronization processing unit 7022 may retrieve differential information of the PIM data which is updated from the previous inquiry from the PIM data server 500 during the synchronization with the PIM data server 500 in regard to the PIM data. The PIM data synchronization processing unit 7022 may update it by storing all the PIM data or a portion of the PIM data which is updated from the previous inquiry in the PIM data holding unit 7024.

The PIM data holding unit 7024 is connected to the PIM data synchronization processing unit 7022. The PIM data holding unit 7024 stores the PIM data which is to be input by the PIN data synchronization processing unit 7022.

When a large-scale disaster occurs, the disaster information retrieving unit 7026 retrieves the disaster area information from the disaster information management server 800. Specifically, when the large-scale disaster occurs, the disaster information retrieving unit 7026 transmits a disaster area information request signal for requesting the disaster area information to the disaster information management server 800. The disaster information retrieval unit 7026 receives the disaster area information, which is transmitted from the disaster information management server 800 as a response to the disaster area information request signal. In this case, the PIM data checking server 700 may transmit the disaster area information request signal to the disaster information management server 800, in response to a command for reporting the relative or the like from the disaster information management server 800. The PIM data checking server 700 may transmit the disaster area information request signal to the disaster information management server 800, in response to an inquiry from the user terminal 100₁. The disaster information retrieving unit 7026 inputs the disaster area information from the disaster information management server 800 to the subscriber information data retrieving unit 7028.

The subscriber information data retrieving unit 7028 is connected to the disaster information retrieving unit 7026. The subscriber information data retrieving unit 7028 transmits a user terminal information request signal including the disaster area information to the subscriber information management server 600, in order to inquire for the user terminal which is served by the disaster area base station. The subscriber information data retrieving unit 7028 retrieves the subscriber information of the user terminal which is served by the disaster area base station from the subscriber information management server 600. The subscriber information of the user terminal which is served by the disaster area base station may be transmitted as a response to the user terminal information request signal. The subscriber information data retrieving unit 7028 inputs the subscriber information of the user terminal which is served by the disaster area base station from the subscriber information management server 600 to the subscriber information data holding unit 7030.

The subscriber information data holding unit 7030 is connected to the subscriber information data retrieving unit 7028. The subscriber information data holding unit 7030 stores the subscriber information of the user terminal which is served by the disaster area base station from the subscriber information data retrieving unit 7028.

The PIM data checking unit 7032 is connected to the PIM data holding unit 7024 and to the subscriber information data holding unit 7030. The PIM data checking unit 7032 determines whether there is PIM data including the subscriber data which is stored in the subscriber information data holding unit 7030, among the PIM data pieces stored in the PIM data holding unit 7024. The PIM data checking unit 7032 inputs a determination result of whether there is the PIM data including the subscriber information which is stored in the subscriber information holding unit. 7030, among the PIM data pieces stored in the PIM data holding unit 7024, to the PIM data matching data processing unit 7034. When the determination result indicates that there is the PIM data including the subscriber information, the PIM data checking unit 7032 inputs the PIM data including the subscriber information to the PIM data matching data processing unit 7034.

The PIM data matching data processing unit 7034 is connected to the PIM data checking unit 7032. Based on the determination result from the PIM data checking unit 7032, when the determination result indicates that there is the PIM data including the subscriber information, the PIM data matching data processing unit 7034 identifies a user terminal having the PIM data which includes the subscriber information. The PIM data matching data processing unit 7034 inputs information indicating the identified user terminal and the subscriber information included in the PIM data to the message transmitting unit 7036.

The message transmitting unit 7036 is connected to the PIM data matching data processing unit 7034. The message transmitting unit 7036 transmits the information representing the user, who corresponds to the subscriber information, to the identified user terminal, based on the information representing the identified user terminal from the PIM data matching data processing unit 7034 and the subscriber information included in the PIM data. The message transmitting unit 7036 may transmits it by using a circuit switched network (CS network) or by using a packet switched network (PS network). Specifically, the message transmitting unit 7036 reports that the relative or the like who is included in the PIM data is in the disaster area.

Further, the message transmitting unit 7036 may prompt the identified user terminal to confirm, for example, a disaster message board, based on the information representing the identified user terminal from the PIM data matching data processing unit 7034 and the subscriber information included in the PIM data. Specifically, a message may be transmitted which requests to access the disaster message board.

<Operations of the Radio Communication System>

Figure 7:
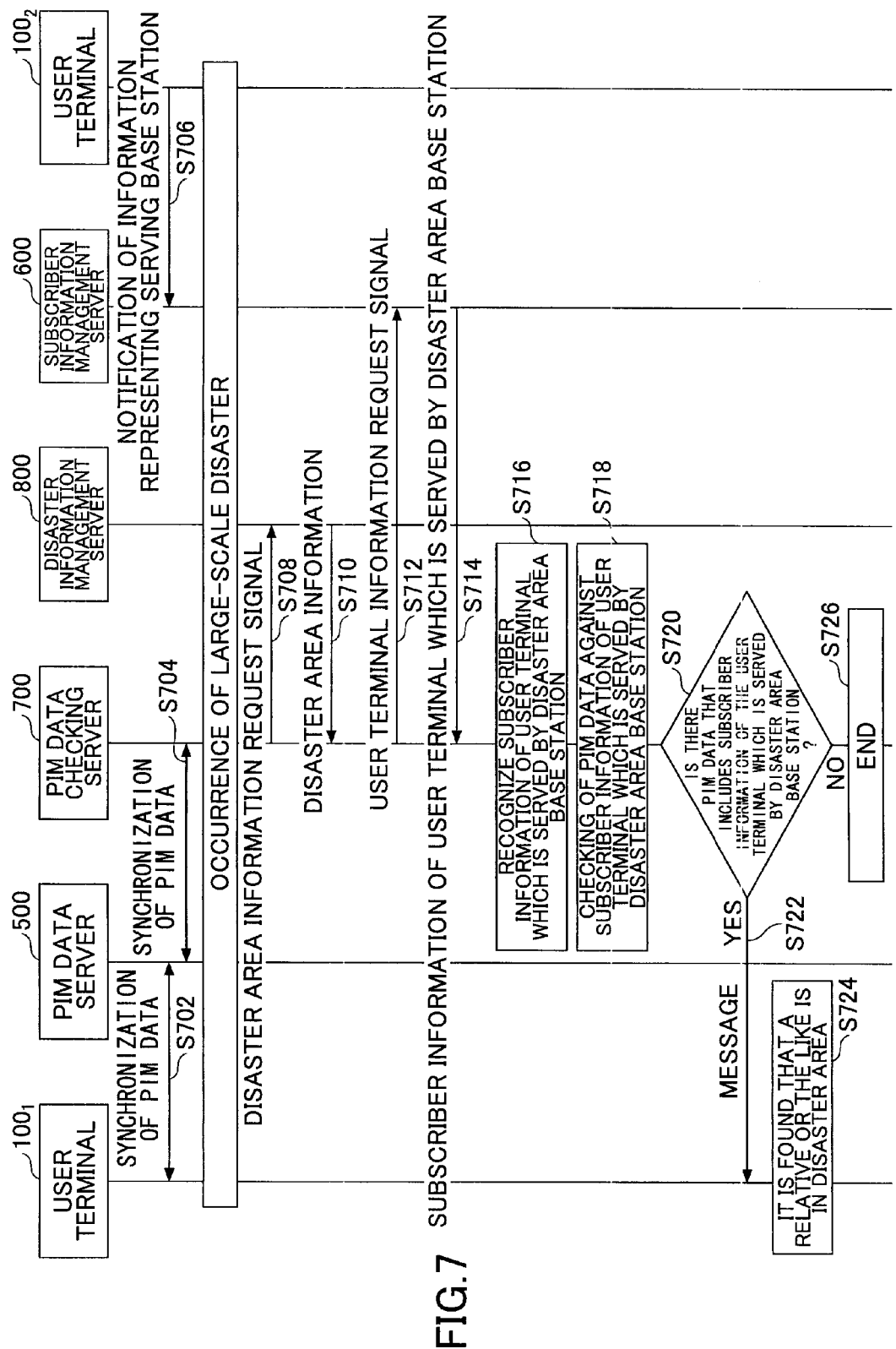
FIG. 7 is a diagram showing one embodiment of operations of the radio communication system.

FIG. 7 is a sequence chart showing one embodiment of operations of the radio communication system.

The user terminal $100_1$ performs synchronization with the PIM data server 500 in regard to the PIM data (step S702). Specifically, the PIM data server 500 may request the PIM data from the user terminal $100_1$ regularly or irregularly. Alternatively, the PIM data may be transmitted from the user terminal $100_1$ to the PIM data server 500 regularly or irregularly. The user terminal $100_1$ may transmit it to the PIM data server 500 when the PIM data is updated.

The PIM data server 500 performs synchronization with the PIM data checking server 700 in regard to the PIM data (step S704). Specifically, the PIM data checking server 700 may request the PIM data from the PIM data server 500 regularly or irregularly. Alternatively, the PIM data may be transmitted from the PIM data server 500 to the PIM data checking server 700 regularly or irregularly. The PIM data server 500 may transmit it to the PIM data checking server 700 when the PIM data is updated.

The user terminal $100_2$ transmits the serving base station information to the subscriber information management server 600 (step S706). Specifically, the serving base station information may be transmitted from the user terminal $100_2$ to the subscriber information management server 600 regularly or irregularly. Alternatively, the user terminal $100_2$ may transmit the serving base station information to the subscriber information management server 600 when it is served or when the serving base station is changed.

The subscriber information management server 600 associates the subscriber information of the user terminal $100_2$ with the serving base station information which is transmitted from the user terminal $100_2$, and stores them.

The processes of steps S702-S706 may be performed regularly or irregularly, regardless of whether a large-scale disaster occurs.

When a large-scale disaster occurs, disaster area information is collected in the disaster information management server 800.

The PIM data checking server 700 transmits the disaster area information request signal to the disaster information management server 800 (step S708). Namely, the disaster information retrieving unit 7026 transmits the disaster area information request signal to the disaster information management server 800.

The disaster information management server 800 transmits the disaster area information as a response to the disaster area information request signal from the PIM data checking server 700 (step S710).

The PIM data checking server 700 transmits the user terminal information request signal to the subscriber information management server 600 (step S712). Namely, the subscriber information data retrieving unit 7028 transmits the user terminal information request signal to the subscriber information management server 600. The user terminal information request signal includes the disaster area information.

The subscriber information management server 600 transmits the subscriber information of the user terminal which is served by the disaster area base station, based on the disaster area information included in the user terminal information request signal from the PIM data checking server 700 (step S714).

The PIM data checking server 700 recognizes the subscriber information of the user terminal which is served by the disaster area base station from the subscriber information management server 600 (step S716). Namely, the subscriber information data retrieving unit 7028 stores the subscriber information of the user terminal which is served by the disaster area base station from the subscriber information management server 600 in the subscriber information data holding unit 7030.

The PIM data checking server 700 checks the PIM data pieces against the subscriber information of the user terminal which is served by the disaster area base station (step S718). Namely, the PIM data checking unit 7032 checks the PIM data pieces stored in the PIM data holding unit 7024 against the subscriber information of the user terminal which is served by the disaster area base station, where the subscriber information is stored in the subscriber information data holding unit 7030. Specifically, the PIM data checking unit 7032 checks the PIM data pieces stored in the PIM data holding unit 7024 against the subscriber information of the user terminal which is served by the disaster area base station.

The PIM data checking server 700 determines whether there is PIM data that includes the subscriber information of the user terminal which is served by the disaster area base station, among the PIM data pieces which are stored in the PIM data holding unit 7024 (step S720). Specifically, the PIM data checking unit 7032 determines whether there is the PIM data that includes the subscriber information of the user terminal which is served by the disaster area base station, among the PIM data pieces which are stored in the PIM data holding unit 7024.

When a determination is made that there is the PIM data including the subscriber information of the user terminal which is served by the disaster area base station (step S720: YES), the PIM data checking server 700 creates a message which is to be transmitted to another user terminal having the PIM data including the subscriber information of the user terminal which is served by the disaster area base station (step S722). Namely, when the determination is made that there is the PIM data including the subscriber information of the user terminal which is served by the disaster area base station, the PIM data checking unit 7032 inputs a determination result indicating that there is the PIM data including the subscriber information of the user terminal which is served by the disaster area base station and the PIM data including the subscriber information to the PIM data matching data processing unit 7034. When the determination result indicates that there is the PIM data including the subscriber information of the user terminal which is served by the disaster area base station, the PIM data matching data processing unit 7034 identifies the other user terminal having the PIM data, based on the PIM data including the subscriber information. The PIM data matching data processing unit 7034 creates a message which is addressed to the other user terminal having the PIM data. The message includes information representing a user of the user terminal which is served by the disaster area base station, where the user terminal which is served by the disaster area base station corresponds to the subscriber information included in the PIM data. The PIM data matching data processing unit 7034 inputs the message to the message transmitting unit 7036. The message transmitting unit 7036 transmits the message, which is input by the PIM data matching data processing unit 7034.

A user of the user terminal $100_1$ which receives the message from the PIM data checking server 700 can find that the relative or the like is in the disaster area, by referring to the user of the user terminal whose information is included in the message, where the user terminal is served by the disaster area base station (step S724).

When it is determined that there is no PIM data including the subscriber information of the user terminal which is served by the disaster area base station (step S720: NO), the process is terminated (step S726). The PIM data checking server 700 may create a message to be transmitted to a user terminal having the PIM data which is stored in the PIM data checking server 700, and may transmit it. Namely, when it is determined that there is no PIM data including the subscriber information of the user terminal which is served by the disaster area base station, the PIM data checking unit 7032 inputs a determination result indicating that there is no PIM data including the subscriber information of the user terminal which is served by the disaster area base station to the PIM data matching data processing unit 7034. When the determination result indicates that there is no PIM data including the subscriber information of the user terminal which is served by the disaster area base station, the PIM data matching data processing unit 7034 creates a message to the user terminal having the PIM data, which is stored in the PIM data checking server 700. The message includes information indicating that there is no relative or the like in the disaster area. The PIM data matching data processing unit 7034 inputs the message to the message transmitting unit 7016. The message transmitting unit 7036 transmits the message, which is input by the PIM data matching data processing unit 7034.

The user of the user terminal $100_1$, which receives the message from the PIM data checking server 700, can find that there is no relative or the like in the disaster area by referring to the message.

The process at step S702 is executed by a CPU (not shown) which is included in the user terminal $100_1$. The processes of steps S702 and S704 are executed by a CPU (not shown) which is included in the PIM data server 500. The processes of steps S704, S708, S712, S716-S722, and S726 are executed by the CPU 702 which is included in the PIM data checking server 700. The process at step S706 is executed by a CPU (not shown) which is included in the user terminal $100_2$. The process at step S710 is executed by a CPU (not shown) which is included in the disaster information management server 800. The process at step S714 is executed by a CPU (not shown) which is included in the subscriber information management server 600.

A program that causes a CPU to function as the user terminals $100_1$ and $100_2$, the PIM data server 500, the PIM data checking server 700, the disaster information management server 800, and the subscriber information management server 600 is provided, for example, in a state where it is recorded in a recording medium, such as a flexible disk, a CD-ROM, and a memory card. Alternatively, the program may be downloaded through a communication network. When the recording medium is inserted into an auxiliary storage unit of a computer, the program which is recorded in the recording medium is read. The CPU writes the read program in a RAM or in a HDD, and the CPU executes processes. The program causes the computer to execute the processes at corresponding steps S702-S726 of FIG. 7. Alternatively, for example, the program may cause at least a portion of the steps to be executed.

According to the embodiment, when a large-scale disaster occurs, it can be automatically transmitted to a user of a user terminal as to whether a person who is registered in PIM data of the user terminal is in a neighborhood of a disaster area. The PIM data includes a phonebook.

For a case where a relative or like who usually lives in the neighborhood of the disaster area is fortunately not staying in the neighborhood of the disaster area, it can be reported that the relative or the Like is not in the neighborhood of the disaster area. Accordingly, even for a case of congestion where it is not possible to directly contact the neighborhood of the disaster area, confirmation of the safety of the relatives or the like can be quickly made.

Modified Example

Radio Communication System

An embodiment of the radio communication system is substantially the same as that of FIGS. 1-4.

The PIM data checking server 700 performs synchronization between the PIM data which is stored in the PIM data checking server 700 and the PIM data which is stored in the PIM data server 500. Namely, when a disaster occurs, the PIM data checking server 700 requests PIM data from the PIM data server 500. By requesting the PIM data from the PIM data server 500 at the time at which the disaster occurs, the process of always synchronizing the PIM data checking server 700 with the PIM data server 500 in regard to the PIM data becomes unnecessary. Thus, the processing load on the PIM data checking server 700 can be reduced.

<PIM Data Checking Server>

A hardware configuration of the PIM data checking server is substantially the same as that of FIG. 5.

<Functions of the PIM Data Checking Server>

Figure 8:
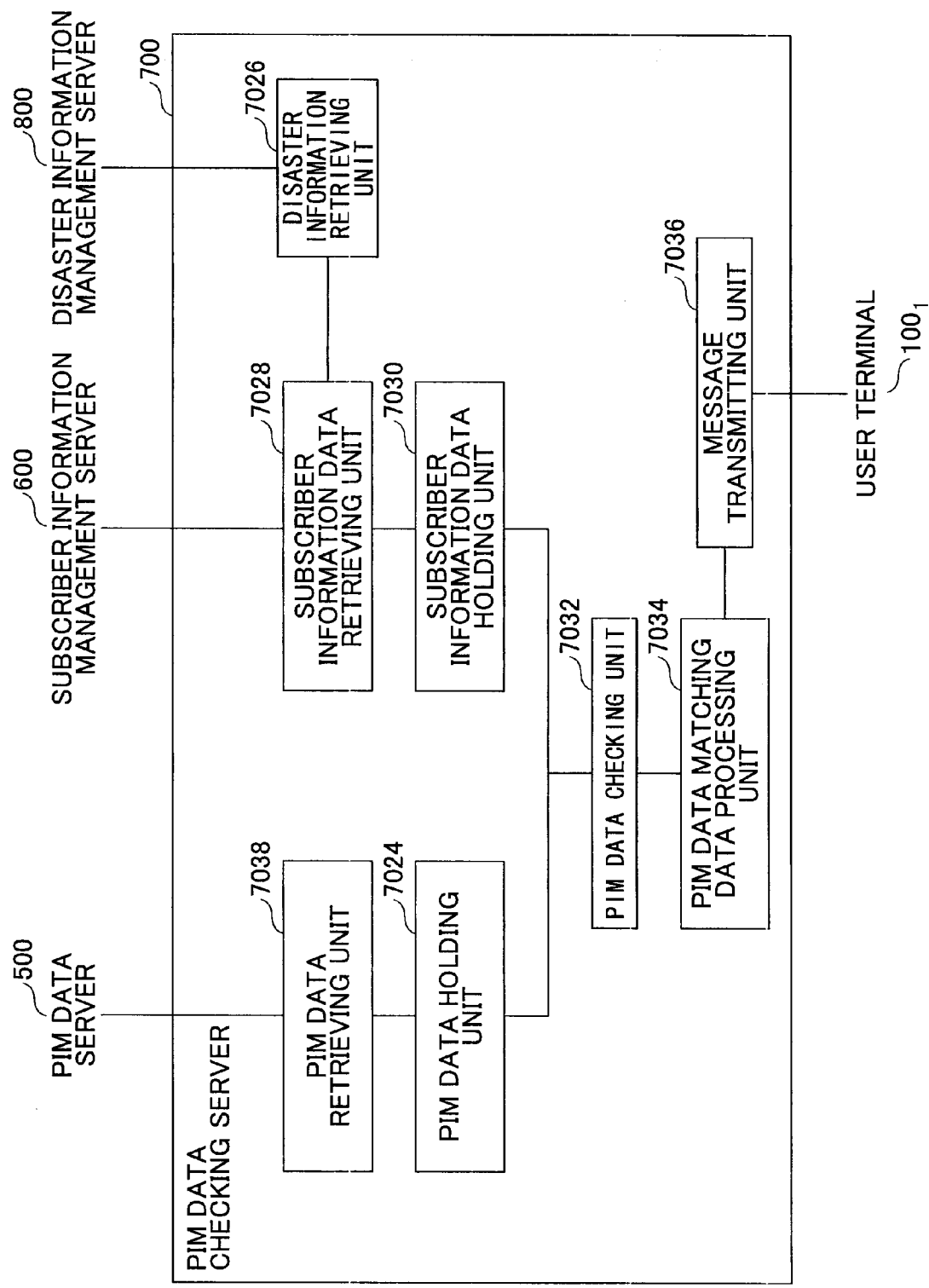
FIG. 8 is a functional block diagram showing one embodiment of the PIM data checking server.

FIG. 8 is a functional block diagram showing an embodiment of the PIM data checking server 700.

The PIM data checking server 700 is such that, in the PIM data checking server 700 which is explained by referring to FIG. 6, the PIM data synchronization processing unit 7022 is replaced by a PIM data retrieving unit 7038.

The PIM data retrieving unit 7038 requests the PIM data from the PIM data server 500. Specifically, the PIM data retrieving unit 7038 may request the PIM data from the PIM data server 500 when a disaster occurs. The PIM data retrieving unit 7038 stores the PIM data from the PIM data server 500 in the PIM data holding unit 7024. The PIM data retrieving unit 7038 may request all the PIM data from the PIM data server 500, or the PIM data retrieving unit 7038 may request difference information of the PIM data which is updated from the previous request. The PIM data retrieving unit 7038 may store all the PIM data or the PIM data which is updated from the previous request.

<Operations of the Radio Communication System>

Figure 9:
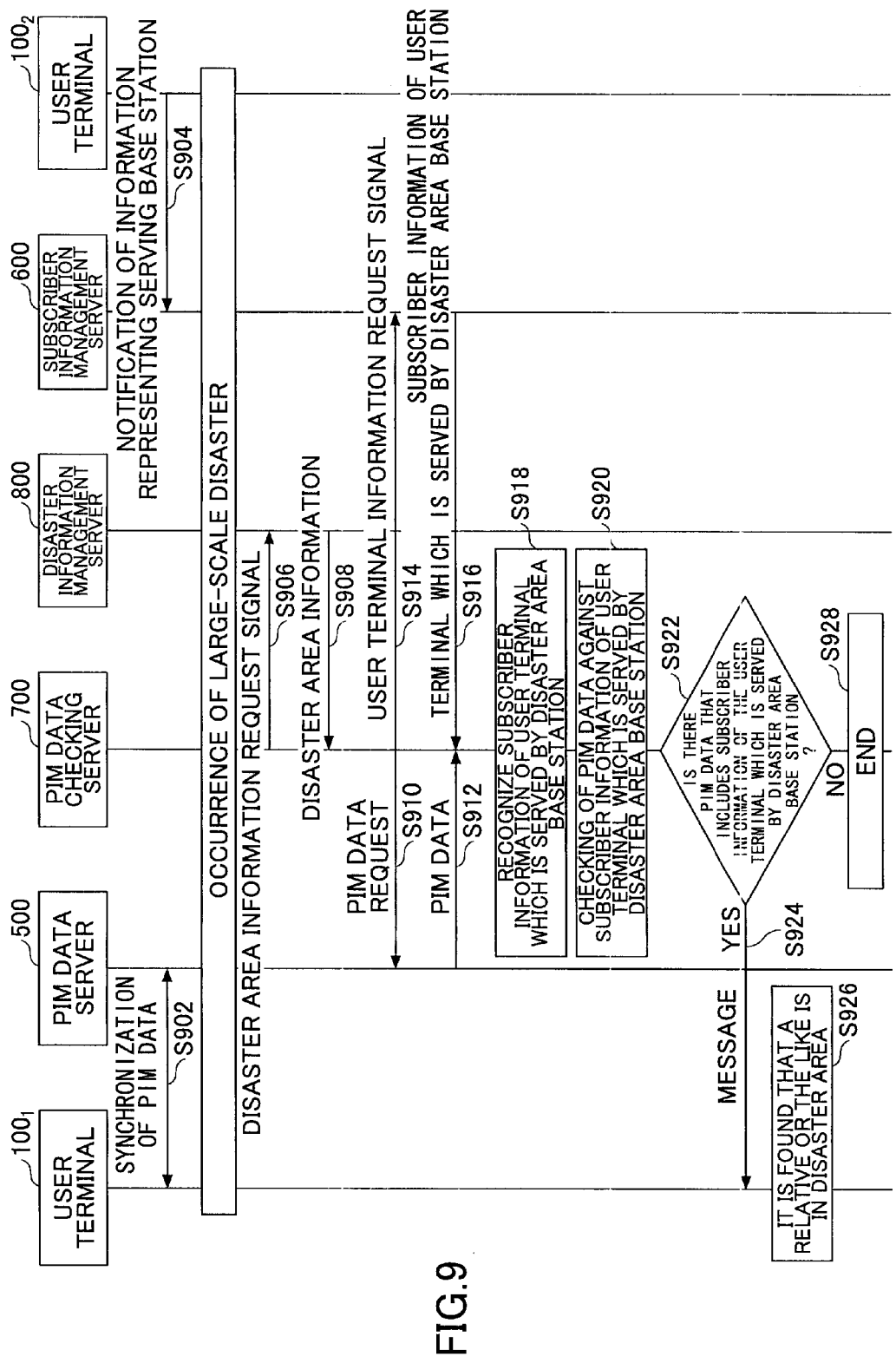
FIG. 9 is a diagram showing one embodiment of operations of the radio communication system.

FIG. 9 is a sequence chart showing an embodiment of operations of the radio communication system.

Synchronization of the PIM data is performed between the user terminal $100_1$ and the PIM data server 500 (step S902). Specifically, the PIM data server 500 may request the PIM data from the user terminal $100_1$ regularly or irregularly. Further, the PIM data may be transmitted from the user terminal $100_1$ to the PIM data server 500 regularly or irregularly. The user terminal $100_1$ may transmit it to the PIM data server 500 when the PIM data is updated.

The user terminal $100_2$ transmits the serving base station information to the subscriber information management server 600 (step S904). Specifically, the serving base station information may be transmitted from the user terminal $100_2$ to the subscriber information management server 600 regularly or irregularly. Further, the user terminal $100_2$ may transmit the serving base station information to the subscriber information management server 600 when it is served, or when the serving base station is changed.

The subscriber information management server 600 associates the subscriber information of the user terminal $100_2$ with the serving base station information which is transmitted from the user terminal $100_2$, and stores them.

The processes of steps S902-S904 may be performed regularly or irregularly, regardless of whether a large-scale disaster occurs.

When the large-scale disaster occurs, disaster area information is collected in the disaster information management server 800.

The PIM data checking server 700 transmits the disaster area information request signal to the disaster information management server 800; step S906). Namely, the disaster information retrieving unit 7026 transmits the disaster information request signal to the disaster information management server 800.

The disaster information management server 800 transmits the disaster area information as a response to the disaster area information request signal from the PIM data checking server 700 (step S908).

The PIM data checking server 700 transmits a PIM data request to the PIM data server 500 (step S910). Namely, the PIM data retrieving unit 7038 transmits the PIM data request to the PIM data server 500.

The PIM data server 500 transmits the PIM data as a response to the PIM data request from the PIM data checking server 700 (step S912). The PIM data checking server 700 holds the PIM data from the PIM data server 500.

The processes at steps S914-S928 are the same as those of steps S712-S726, which are explained by referring to FIG. 7.

The process at step S902 is executed by the CPU (not shown) which is included in the user terminal $100_1$. The processes at steps S902 and S912 are executed by the CPU (not shown) which is included in the PIM data server 500. The processes at steps S906, S910, S914, S918-S924, and S928 are executed by the CPU 702 which is included in the PIM data checking server 700. The process at step S904 is executed by the CPU (not shown) included in the user terminal $100_2$. The process at step S908 is executed by the CPU (not shown) included in the disaster information management server 800. The process at step S916 is executed by the CPU (not shown) included in the subscriber information management server 600.

A program that causes a CPU to function as the user terminals $100_1$ and $100_2$, the PIM data server 500, the PIM data checking server 700, the disaster information management server 800, the subscriber information management server 600 may be provided, for example, in a state where it is stored in a storage medium such as a flexible disk, a CD-ROM, and a memory card. Alternatively, the program may be downloaded through a communication network. When the recording medium is input to an auxiliary storage device of a computer, the program recorded in the storing medium is read. The CPU writes the read program in the RAM or in the HDD, and the CPU executes the processes. The program causes the computer to execute steps S902-S928 of FIG. 9. Further, for example, the program may cause at least a portion of the steps to be executed.

According to the embodiment, since the PIM data checking server 700 requests the PIM data from the PIM data server 500 when the disaster occurs, it is not necessary that the PIM data is always synchronized between the PIM data checking server 700 and the PIM data server 500.

The above-described embodiments and modified examples are not limited to the case where a large-scale disaster occurs. It may be operated when a specified phenomenon occurs. The specified phenomenon may be a phenomenon which has been specified in advance.

According to the embodiments, there is provided a radio communication system that is capable of reporting that there is a relative or the like in a neighborhood of a disaster area when a disaster or the like occurs.

The radio communication system includes a personal information data server that manages personal information which is stored in a first user terminal;

a subscriber information management server that manages, for each of user terminals, subscriber information and information representing a base station which serves for the user terminal while associating the subscriber information with the information representing the base station; and a personal information checking server, wherein the personal information checking server includes an area information retrieving unit that retrieves, when a specified phenomenon occurs, information representing an area where the specified phenomenon occurs;

a subscriber information retrieving unit that retrieves subscriber information of a second user terminal from the subscriber information management server, based on the information representing the area where the specified phenomenon occurs, wherein the information representing the area where the specified phenomenon occurs is retrieved by the area information retrieving unit, and the second user terminal is served by the base station which is installed in the area where the specified phenomenon occurs;

a personal information checking unit that checks the personal information against the subscriber information, and that identifies the first user terminal that includes the personal information including the subscriber information, wherein the personal information is managed by the personal information data server, and the subscriber information is retrieved by the subscriber information retrieving unit; and a message transmitting unit that reports to the first user terminal which is identified by the personal information checking unit that there is a user of the second user terminal in the area where the specified phenomenon occurs, wherein the second user terminal includes the subscriber information, and wherein the subscriber information is included in the personal information of the first user terminal.

Further, the personal information checking server may includes a personal information synchronization processing unit that performs synchronization with the personal information data server in regard to the personal information, wherein the personal information checking unit may check the personal information against the subscriber information, wherein the personal information is synchronized by the personal information synchronization processing unit, and the subscriber information is retrieved by the subscriber information retrieving unit.

The personal information checking server may include a personal information retrieving unit that retrieves, when the specified phenomenon occurs, the personal information from the personal information data server, wherein the personal information checking unit may check the personal information against the subscriber information, wherein the personal information is retrieved by the personal information retrieving unit, and the subscriber information is retrieved by the subscriber information retrieving unit.

The personal information managed by the personal information data server may include phonebook data.

The area information retrieving unit may retrieve the information representing the area, wherein the area is specified by at least one of the area which is specified at a cell level, the area which is specified at a tracking area level, and the area which is set by an operator.

Further, according to the embodiments, there is provided a server which is for reporting that there is a relative or the like in a neighborhood of a disaster area, when a disaster or the like occurs.

The server includes an area information retrieving unit that retrieves, when a specified phenomenon occurs, information representing an area where the specified phenomenon occurs;

a subscriber information retrieving unit that retrieves subscriber information of a second user terminal from a subscriber information management server, based on the information representing the area where the specified phenomenon occurs, wherein the subscriber information management server manages, for each of user terminals, the subscriber information and information representing a base station which serves for the user terminal while associating the subscriber information with the information representing the base station, wherein the information representing the area where the specified phenomenon occurs is retrieved by the area information retrieving unit, and wherein the second user terminal is served by the base station which is installed in the area where the specified phenomenon occurs;

a personal information checking unit that checks the personal information against the subscriber information, and that identifies a first user terminal that includes the personal information including the subscriber information, wherein the personal information is managed by a personal information database that manages the personal information stored in the first user terminal, and the subscriber information is retrieved by the subscriber information retrieving unit; and a message transmitting unit that reports to the first user terminal which is identified by the personal information checking unit that there is a user of the second user terminal in the area where the specified phenomenon occurs, wherein the second user terminal includes the subscriber information, wherein the subscriber information is included in the personal information of the first user terminal.

Further, according to the embodiments, there is provided a message notification method which is for reporting that there is a relative or the like in a neighborhood of a disaster area, when a disaster or the like occurs.

The message notification method includes an area information retrieving step of retrieving, when a specified phenomenon occurs, information representing an area where the specified phenomenon occurs;

a subscriber information retrieving step of retrieving subscriber information of a second user terminal from a subscriber information management server, based on the information representing the area where the specified phenomenon occurs, wherein the subscriber information management server manages, for each of user terminals, the subscriber information and information representing a base station which serves for the user terminal while associating the subscriber information with the information representing the base station, wherein the information representing the area where the specified phenomenon occurs is retrieved by the area information retrieving step, and wherein the second user terminal is served by the base station which is installed in the area where the specified phenomenon occurs;

a personal information checking step of checking the personal information against the subscriber information, and identifying a first user terminal that includes the personal information including the subscriber information, wherein the personal information is managed by a personal information database that manages the personal information stored in the first user terminal, and the subscriber information is retrieved by the subscriber information retrieving step; and a message transmitting step of reporting to the first user terminal which is identified by the personal information checking step that there is a user of the second user terminal in the area where the specified phenomenon occurs, wherein the second user terminal includes the subscriber information, wherein the subscriber information is included in the personal information of the first user terminal.

For convenience of the explanation, specific examples of numerical values are used in order to facilitate understanding of the invention. However, these numerical values are simply illustrative, and any other appropriate values may be used, except as indicated otherwise.

Hereinabove, the radio communication system, the server, and the message notification method are explained by the embodiments. However, the present invention is not limited to the above-described embodiments, and various modifications and improvements may be made within the scope of the present invention. For the convenience of explanation, the devices according to the embodiments of the present invention are explained by using functional block diagrams. However, these devices may be implemented in hardware, software, or combinations thereof.

The present application claims priority based on Japanese Patent Application No. 2011-175348, filed on Aug. 10, 2011, the entire contents of which are hereby incorporated by reference.

LIST OF REFERENCE SYMBOLS $100_1$, $100_2$: User terminals
$200_1$, $200_2$: Base stations
$250_1$, $250_2$: Cells
$400_1$, $400_2$: Switching system
500: PIM data server
600: Subscriber information management server
700: PIM data checking server
702: CPU
704: Storage device
706: Input device
708: Output device
750: Bus
800: Disaster information management server
900: Core network
950: Bus
7022: PIM data synchronization processing unit
7024: PIM data holding unit
7026: Disaster information retrieving unit
7028: Subscriber information data retrieving unit
7030: Subscriber information data holding unit
7032: PIM data checking unit
7034: PIM data matching data processing unit 7036: Message transmitting unit
7038: PIM data retrieving unit

The invention claimed is:
1. A radio communication system comprising:
a personal information data server adapted to manage phonebook data which is stored in a user terminal;
a subscriber information management server adapted to manage, for each of user terminals, subscriber information and information representing a base station which serves for the user terminal while associating the subscriber information with the information representing the base station; and
a personal information checking server including,
area information retrieving circuitry adapted to retrieve information representing an area;
subscriber information retrieving circuitry adapted to retrieve subscriber information of a user terminal that is served by a base station that is installed in the area from the subscriber information management server, based on the information representing the area that is retrieved by the area information retrieving circuitry;
personal information checking circuitry adapted to check the phonebook data that is managed by the personal information data server against the subscriber information that is retrieved by the subscriber information retrieving circuitry, and adapted to identify a user terminal that includes phonebook data including the subscriber information; and
message transmitting circuitry, wherein, when a specified phenomenon occurs, the area information retrieving circuitry is adapted to retrieve information representing an area where the specified phenomenon occurs, the subscriber information retrieving circuitry is adapted to retrieve, from the subscriber information management server, subscriber information of a second user terminal that is served by a base station that is installed in the area where the specified phenomenon occurs, based on the information representing the area where the specified phenomenon occurs; the personal information checking circuitry is adapted to identify a first user terminal that includes phonebook data that includes the subscriber information of the second user terminal; and the message transmitting circuitry is adapted to report to the first user terminal that is identified by the personal information checking circuitry that a user of the second user terminal that includes the subscriber information that is included in the phonebook data of the first user terminal exists in the area where the specified phenomenon occurs.

2. The radio communication system according to claim 1, wherein the personal information checking server includes personal information synchronization processing circuitry adapted to perform synchronization with the personal information data server in regard to the phonebook data that is managed by the personal information data server, and
wherein the personal information checking circuitry is adapted to check the phonebook data that is synchronized by the personal information synchronization processing circuitry against the subscriber information that is retrieved by the subscriber information retrieving circuitry.

3. The radio communication system according to claim 1, wherein the personal information checking server includes personal information retrieving circuitry adapted to retrieve, when the specified phenomenon occurs, the phonebook data from the personal information data server, and
wherein the personal information checking circuitry is adapted to check the phonebook data that is retrieved by the personal information retrieving circuitry against the subscriber information that is retrieved by the subscriber information retrieving circuitry.

4. The radio communication system according to claim 1, wherein the area information retrieving circuitry is adapted to retrieve the information representing the area, wherein the area is specified by at least one of the area which is specified at a cell level, the area which is specified at a tracking area level, and the area which is set by an operator.

5. A server comprising:
area information retrieving circuitry adapted to retrieve information representing an area;
subscriber information retrieving circuitry adapted to retrieve, from a subscriber information management server adapted to manage, for each of user terminals, subscriber information and information representing a base station which serves for a user terminal while associating the subscriber information with the information representing the base station, subscriber information of a user terminal that is served by a base station that is installed in the area based on the information representing the area;
personal information checking circuitry adapted to check phonebook data that is managed by a personal information database adapted to manage the phonebook data stored in a user terminal against the subscriber information that is retrieved by the subscriber information retrieving circuitry, and adapted to identify a user terminal that includes the phonebook data including the subscriber information; and
message transmitting circuitry, wherein, when a specified phenomenon occurs, the area information retrieving circuitry is adapted to retrieve information representing an area where the specified phenomenon occurs; the subscriber information retrieving circuitry is adapted to retrieve, from the subscriber information management server, subscriber information of a second user terminal that is served by a base station that is installed in the area where the specified phenomenon occurs, based on the information representing the area where the specified phenomenon occurs; the personal information checking circuitry is adapted to identify a first user terminal that includes phonebook data that includes the subscriber information of the second user terminal; and the message transmitting circuitry is adapted to report to the first user terminal that is identified by the personal information checking circuitry that a user of the second user terminal that includes the subscriber information that is included in the phonebook data of the first user terminal exists in the area where the specified phenomenon occurs.

6. A message notification method comprising:
an area information retrieving step of retrieving information representing an area;
a subscriber information retrieving step of retrieving, from a subscriber information management server adapted to manage, for each of user terminals, subscriber information and information representing a base station which serves for a user terminal while associating the subscriber information with the information representing the base station, subscriber information of a user terminal that is served by a base station that is installed in the area based on the information representing the area;

a personal information checking step of checking phonebook data that is managed by a personal information database adapted to manage the phonebook data stored in a user terminal against the subscriber information that is retrieved by the subscriber information retrieving step, and identifying a user terminal that includes the phonebook data including the subscriber information; and a message transmitting step, wherein, when a specified phenomenon occurs the area information retrieving step retrieves information representing an area where the specified phenomenon occurs; the subscriber information retrieving step retrieves, from the subscriber information management server, subscriber information of a second user terminal that is served by a base station that is installed in the area where the specified phenomenon occurs, based on the information representing the area where the specified phenomenon occurs; the personal information checking step identifies a first user terminal that includes phonebook data that includes the subscriber information of the second user terminal; and the message transmitting step reports to the first user terminal that is identified by the personal information checking step that a user of the second user terminal that includes the subscriber information that is included in the phonebook data of the first user terminal exists in the area where the specified phenomenon occurs.

* * * * *